United States Patent [19]

Takatori et al.

[11] Patent Number: 4,775,989
[45] Date of Patent: Oct. 4, 1988

[54] TIMING PHASE DETECTOR CIRCUIT

[75] Inventors: Hiroshi Takatori, Kokubunji; Toshiro Suzuki, Tama; Tatsuya Kameyama, Hachioji, all of Japan

[73] Assignee: Hitachi, Ltd., Tokyo, Japan

[21] Appl. No.: 878,582

[22] Filed: Jun. 26, 1986

[30] Foreign Application Priority Data

Jul. 3, 1985 [JP] Japan .................. 60-144734

[51] Int. Cl.<sup>4</sup> ............... H04L 7/02; H04L 7/04
[52] U.S. Cl. .................. 375/110; 375/106; 375/111
[58] Field of Search ........... 375/106, 110, 111, 113, 375/14, 16

[56] References Cited

U.S. PATENT DOCUMENTS

| 4,295,222 | 10/1981 | Van Uffelen | 375/111 |
| 4,404,680 | 9/1983 | Perkins | 375/111 |
| 4,577,334 | 3/1986 | Boer et al. | 375/111 |

OTHER PUBLICATIONS

"A New Equalizing Scheme for Digital Subscriber Loop," *IEEE*, 1981.

*Primary Examiner*—Stephen C. Buczinski
*Assistant Examiner*—Linda J. Wallace
*Attorney, Agent, or Firm*—Antonelli, Terry & Wands

[57] ABSTRACT

In a waveform differential type timing phase detector circuit, phase information available from the timing phase detector circuit is made valid for use as control information only when the input pulse assumes a specified pattern, in order to detect a timing phase signal removal of jitters due to waveform distortion.

5 Claims, 5 Drawing Sheets

TIMING PHASE DETECTOR CIRCUIT

BACKGROUND OF THE INVENTION

This invention relates to timing phase detector circuits and more particularly to a circuit for obtaining a timing phase synchronous with a system period of a transmitting data signal or a receiving digital signal.

In order to transmit a digital signal or to reproduce and decode the transmitted digital signal, a timing phase signal must be generated which is in synchronism with a system period of a received digital signal.

Various types of circuits have hitherto been known as this kind of circuit for obtaining the timing phase synchronous with the system period of the transmitting digital signal, that is, as a timing phase detector circuit.

In these prior systems, system period information is detected from the receiving signal and used as a control signal for a voltage controlled oscillator (VCO). Accordingly, in the event that the receiving signal is distorted due to the fact that, for example, the pulse waveform is distorted by echoes or a pulse train forming the receiving signal changes in polarity, the detected system period information itself tends to contain jitters. Conventionally, the jitters have not been considered to be unduly serious if the system period is long but they become terribly problematic in high speed pulse transmission.

In one particular timing phase detector circuit, termed a waveform differential timing detector circuit, since the timing phase is detected at a decision phase which coincides with a point of time t at which the amplitude of the receiving pulse waveform becomes a maximum, the receiving pulse is sampled at time points $t+\Delta t$ and $t-\Delta t$, where $\Delta t$ is an interval of time sufficiently less than the system period, and the decision phase t is controlled by controlling the difference between the two sampled values such that it converges toward zero.

Advantageously, the waveform differential timing detector circuit does not require a highly accurate element such as a tank circuit and hence its characteristics will not be degraded under the influence of temperature variations and aging. In addition, there is no need for providing phase setting (presetting, in design, of the difference between a decision phase exhibited by the tank circuit and an actually optimum decision phase) which is otherwise indispensable for the use of the tank circuit.

However, the waveform differential timing detector circuit does away with taking into consideration jitters attributable to degraded waveform caused by echoes or pattern jitters attributable to finiteness of $\Delta t$.

SUMMARY OF THE INVENTION

Accordingly, an object of this invention is to realize a circuit capable of detecting a timing phase with less jitters even in a transmission system in which waveform degradation due to echoes is imminent and an alternative mark inversion code signal is used which tends to disturb waveform symmetry.

According to this invention, to accomplish the above object, only a signal of a pulse pattern within a pulse train forming a transmitting signal is selected to minimize the generation of waveform distortion leading to jitters, and the selected pulse pattern portion signal is used to control a control circuit adapted to generate timing phase signals so that a correct timing phase can be detected.

A condition of a desirable pattern is such that timing information originating from the pattern coincides with an optimum decision phase of the receiving signal even when inter-code interferences affected by the pattern are taken into consideration. Especially, in a desirable instance, inter-code interferences of the past pattern should not have influence upon the selected pattern and should be cancelled out mutually.

The above-mentioned and other features and objects of this invention will become more apparent by reference to the following description taken in conjunction with the accompanying drawings.

DESCRIPTION OF THE PREFERRED EMBODIMENTS

The present invention will now be described by way of example with reference to the accompanying drawings.

Figure 1:
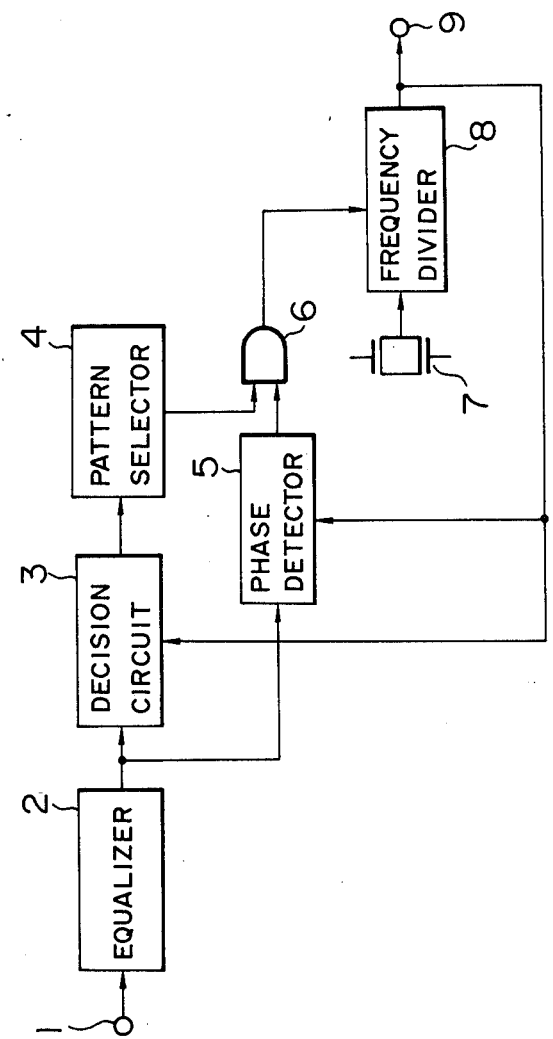
FIG. 1 is a block diagram showing the construction of a timing phase detector circuit according to an embodiment of this invention.

Referring to FIG. 1, a timing phase detector circuit embodying the present invention is schematically illustrated where a receiving signal in the form of a pulse train is applied to an input terminal 1. An equalizer 2 equalizes a waveform of the receiving signal and produces an output signal which is supplied to a decision circuit 3. The decision circuit 3 is responsive to a detected timing phase signal so as to decide which of, for example, "0", "1" and "−1" the pulse signal assumes. The output signal of the equalizer 2 is also supplied to a phase detector 5 so that phase information or timing phase signals contained in the receiving signal can be detected thereby. The timing phase signal obtained at this stage may contain information which is so affected by waveform distortion of the receiving signal as to have timing jitters. As the phase detector 5, the aforementioned waveform differential timing detector circuit may be used wherein the equalizing waveform is sampled at time points $t-\Delta t$ and $t+\Delta t$ and polarity of the difference in amplitude between the two sampled values is determined to provide a digital signal of "0" or "1", where t represents a decision phase preset internally. For the present purpose, a waveform differential timing detector circuit such as disclosed in "A New Equalizing Scheme for Digital Subscriber Loop" by Takatori et al, Proc. of National Telecommunications Conference, 1981, E1.5.1 to E1.5.6 may be used.

A pattern selector 4 produces an output signal only when there is formed from the pulse train decided by the decision circuit 3 a specified pattern, i.e., a pulse arrangement which is immune to jitters due to such factors as waveform distortion.

The output signals of the pattern selector 4 and phase detector 5 are fed to an AND circuit 6. Thus, among pieces of phase information, only information corresponding to a pulse string of the specified pattern selected by the pattern selector 4 is passed through the AND circuit 6 to a frequency divider 8. The frequency divider 8 divides the frequency of an output signal from a crystal oscillator 7. Normally, the frequency divider 8 performs a 1/N frequency division, where N is an integer. If there is a phase difference between the receiving signal and the detected timing phase signal, then the frequency division will be changed to, for example, 1/(N−1) or 1/(N+1) to ensure that the phase of the detected timing phase signal delivered out of the frequency divider 8 can be corrected with respect to the phase of the receiving signal, thereby obtaining a correct timing phase signal.

As will be seen from the embodiment described previously, the pattern selector 4 causes the control information to take place only when the specified pulse string pattern occurs which is immune to generation of erroneous phase information, and as a result, the influence of pattern jitters due to waveform distortion can be suppressed considerably.

Figure 2:
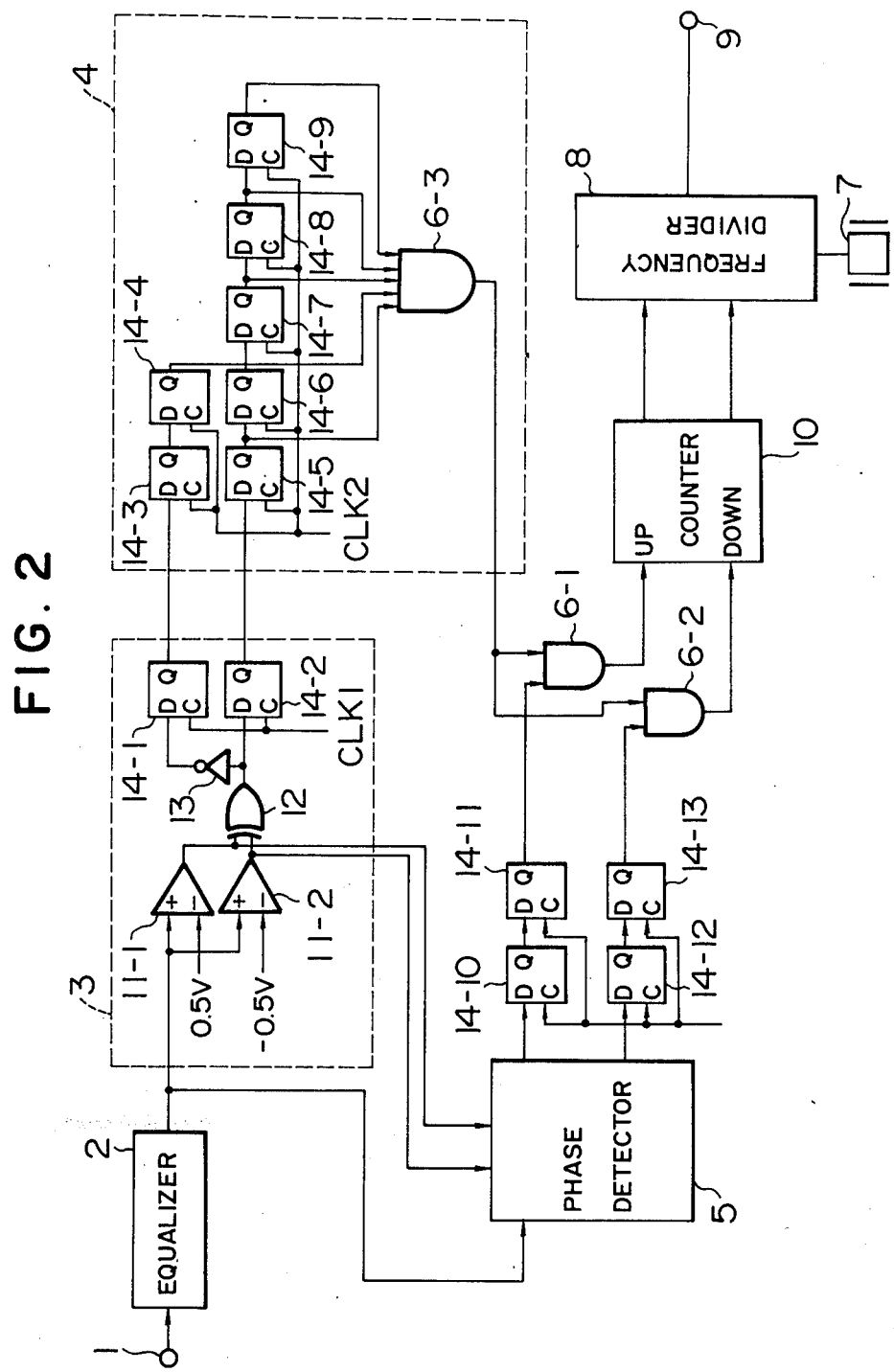
FIG. 2 illustrates a circuit arrangement for specifically implementing the FIG. 1 circuit.

When using the alternative mark inversion code as the pulse train of the receiving signal, the timing phase detector circuit of this invention can specifically be implemented as shown in FIG. 2.

In the alternative mark inversion code representative of the pulse train used in this implementation, "+1" and "−1" of a ternary signal represented by "+1, 0, −1" occur alternately. Therefore, the pulse train is passed through the equalizer 2 to the decision circuit 3 which, in this implementation, specifically decides which of "+1", "0" and "−1" the pulse of the pulse train assumes. The decision circuit 3 includes two comparators 11-1 and 11-2 respectively having thresholds of ±0.5V relative to a signal amplitude of 1.0V, an exclusive OR gate 12, an inverter 13, and shift registers 14-1 and 14-2 having a latch function. When the alternative mark inversion code is +1, a digital signal of "1" is produced from the shift register 14-1 in synchronism with an internal clock CLK 1. Similarly, a "1" digital signal is obtained from the shift register 14-2 in timed relationship with the clock CLK 1 when the alternative mark inversion code is 0 (zero). Thus, the decision circuit 3 has the function of data decision and an additional function of bipolar/unipolar conversion from alternative mark inversion code to NRZ code. The pattern selector 4 includes shift registers 14-3 to 14-9 and a logical multiplier (AND circuit) 6-3 and produces an output signal of "1" at the output of the multiplier 6-3 only when the data pattern assumes a specified pattern of "0, 0, 0, 1, 0". This specified pattern "0, 0, 0, 1, 0" referred to herein is characteristic of the fact that the initial three bits of "0" occur in sequence and a pattern of "1, 0" follows. Accordingly, this specified pattern is effective to nullify all inter-code interferences in the three preceding bits by the sequential "0" bit pattern and remove pattern effect following "1" by the succeeding "1, 0" pattern.

On the other hand, the phase detector 5 in the form of the waveform differential timing detector fetches information indicative of a waveform differential only when the output information pieces of the comparators 11-1 and 11-2 cooperate to inform the phase detector that the bipolar pulse assumes "1" or "−1", and sends information on leading phase to a shift register 14-10 and information about a lagging phase to a shift register 14-12. Shift registers 14-10 to 14-13 are necessary for delaying the phase information. More particularly, this delay circuit is necessarily employed for synchronization of the phase informaion with the decision phase information occurring at a time point for "1" in the pattern "0, 0, 0, 1, 0" delivered out of the pattern selector 4. Only during occurrence of the specified pattern, the phase information thus synchronized with this specified pattern selected from the pattern selector 4 is passed through AND gates 6-1 and 6-2 to an up/down counter 10. The up/down counter 10 constitutes together with oscillator 7 and divider 8 a so-called digital PLL (phase locked loop) which slightly changes the frequency division of the frequency divider 8 adapted to divide the oscillation frequency of crystal oscillator 7 when the input pulse counted by the up/down counter 10 overflows or underflows.

Figure 3:
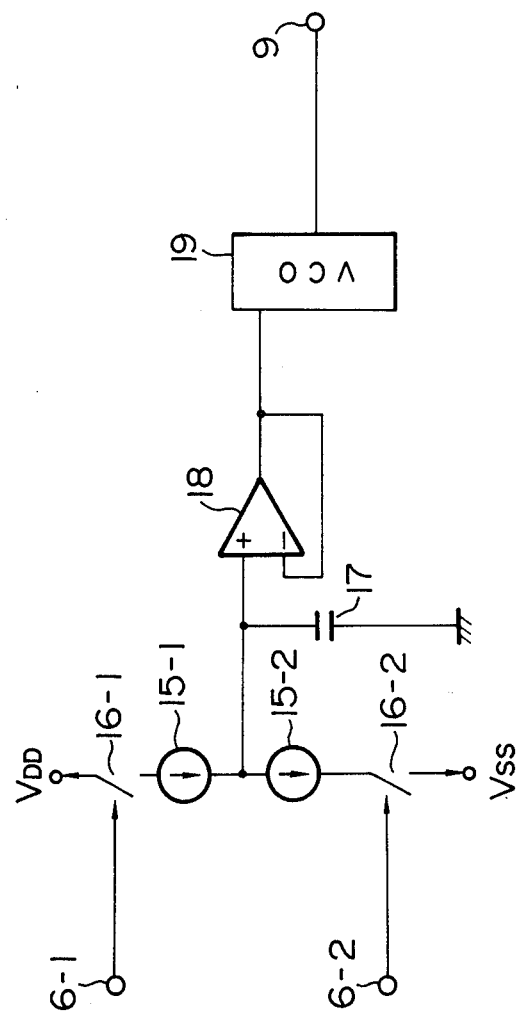
FIG. 3 is a circuit diagram showing a modification of part of the FIG. 2 circuit.

Such a PLL may be modified into an analog PLL as shown in FIG. 3. In the FIG. 3 modification, output signals of the AND gates 6-1 and 6-2 shown in FIG. 2 are integrated in analog fashion so as to control the oscillation frequency of a VCO 19. Constant current sources 15-1 and 15-2 are respectively fed from power supplies $V_{DD}$ and $V_{SS}$ in response to an up pulse from the AND gate 6-1 and a down pulse from the AND gate 6-2 so as to charge an integration capacitor 17 positively and negatively. A stored charge drives the VVCO 19 via a buffer 18.

Figure 4:
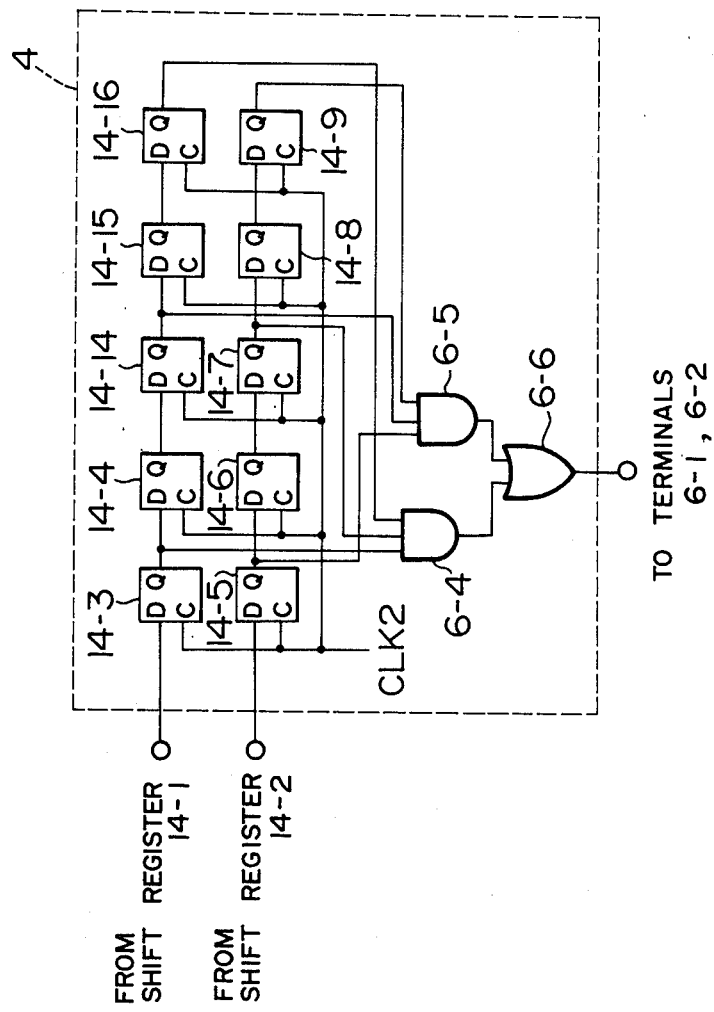
FIGS. 4 and 5 are circuit diagrams illustrating different embodiments of a pattern selector (4) in FIG. 2.
Figure 5:
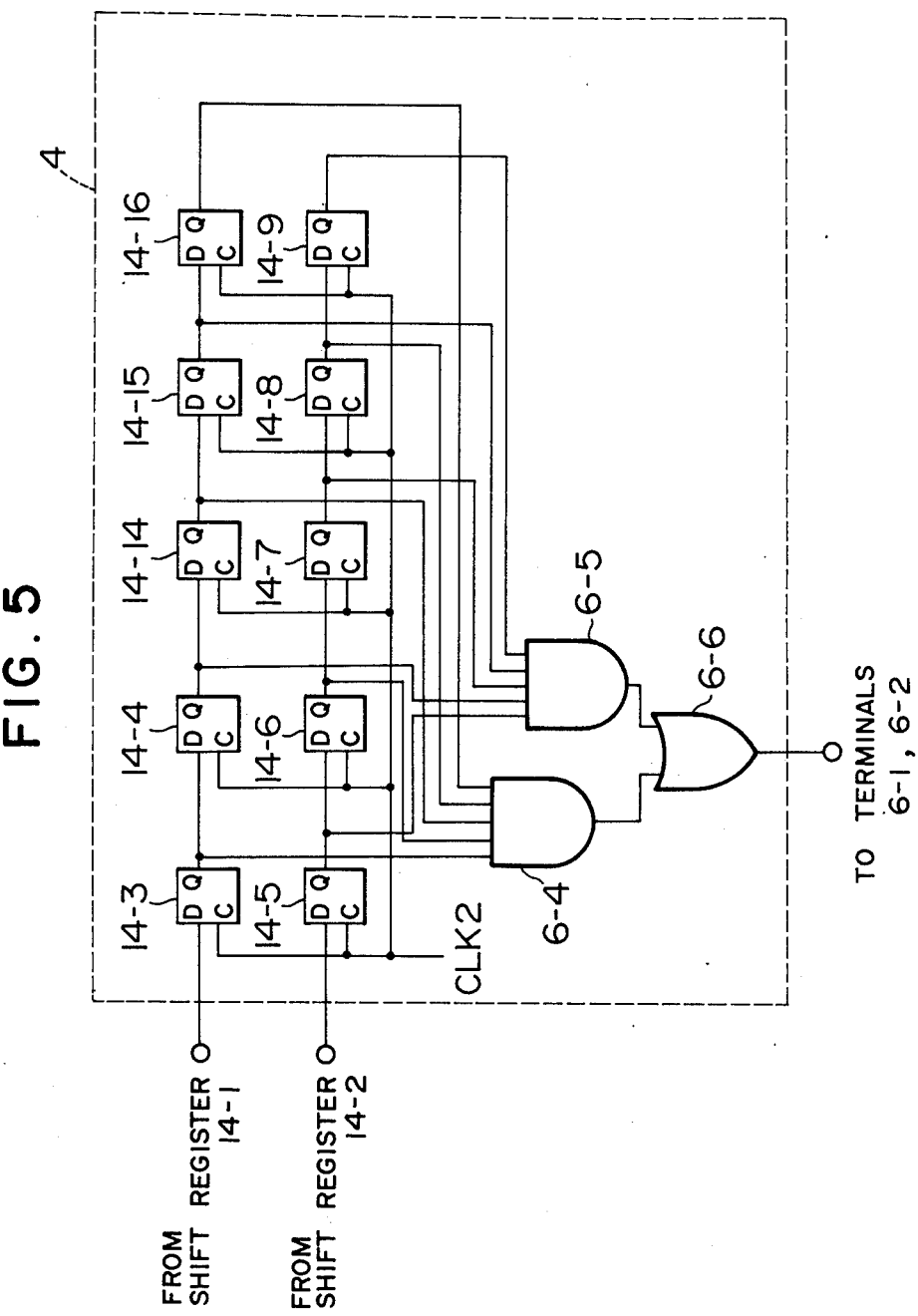

The pattern selector 4 may be altered as shown in FIGS. 4 and 5. The embodiment of FIG. 4 includes D-type flip-flops 14-3 to 14-9 and 14-14 to 14-16 driven by a clock signal CLK 2, AND gates 6-4 and 6-5, and an OR gate 6-6, thereby producing an output signal of "1" for detection of a timing phase only when the input bipolar (alternative mark inversion code) pulse train assumes a pattern of either "−1, 0, +1, 0" or "+1, 0, −1, 0, +1".

The embodiment of FIG. 5 is the same as that of FIG. 4 with the only exception that wirings to the inputs of the AND gates 6-4 and 6-5 are established differently. This altered pattern selector responds to the input bipolar pulse train assuming a pattern of either "+1, −1, +1, −1, +1" or "−1, +1, −1, +1, −1", thereby producing an output signal of "1" for detection of a timing phase when the middle of five bits occurs.

While in the foregoing description the three kinds of specified patterns of bipolar code have been described for illustration purpose only, the kind of pattern as well as the type of pulse code is not limited thereto. For example, with a receiving signal in the form of a binary code pulse, a specified pattern such as represented by "0, 0, 1, 0" or at least one of "0, ±1, 0" and "±1, ∓1, ±1" in a 4B3T pulse which are three-bit ternary codes converted from four-bit binary codes may be used.

We claim:

1. A timing phase detector circuit for generating a decision timing signal for control of a decision circuit, comprising:
   a first circuit for receiving a pulse train from an input to said decision circuit and for detecting phase information from said pulse train;
   a timing signal generator including a frequency divider for supplying said decision timing signal to said decision circuit and for supplying a timing signal to said first circuit, said frequency divider being controlled by an output of said first circuit;
   a pattern selector for detecting a specified pulse train output by said decision circuit; and
   a second circuit responsive to an output signal from said pattern selector for making valid at least one piece of information among said detected phase information corresponding to said specified pulse train.

2. A timing phase detector circuit according to claim 1, wherein said first circuit comprises means for detecting a phase at which a pulse amplitude of a receiving pulse signal becomes maximum by comparing two values sampled from said receiving pulse signal at a predetermined interval of time.

3. A timing phase detector circuit according to claim 2, wherein said receiving pulse signal pulse is a binary pulse and said specified pulse train is represented by "0, 0, 1, 0".

4. A timing phase detector circuit according to claim 2, wherein said receiving pulse signal pulse is a bipolar pulse and said specified pulse train is represented by at least one of "0, 0, 0, $\pm 1$, 0"; "0, $\pm 1$, 0"; "$\mp 1$, 0, $\pm 1$, 0, $\mp 1$" and "$\pm 1$, $\mp 1$, $\pm 1$, $\mp 1$, $\pm 1$".

5. A timing phase detector circuit according to claim 2, wherein said specified pulse train is represented by at least one of "0, $\pm 1$, 0" and "$\pm 1$, $\mp 1$, $\pm 1$".

* * * * *